US007274770B2

(12) United States Patent
Nederpelt

(10) Patent No.: US 7,274,770 B2
(45) Date of Patent: Sep. 25, 2007

(54) X-RAY EXAMINATION APPARATUS AND A METHOD OF CONTROLLING AN OUTPUT OF AN X-RAY SOURCE OF AN X-RAY EXAMINATION APPARATUS

(75) Inventor: Christianus Gerardus Lambertus Maria Nederpelt, Nuenen (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/577,108

(22) PCT Filed: Oct. 21, 2004

(86) PCT No.: PCT/IB2004/052169

§ 371 (c)(1),
(2), (4) Date: Apr. 25, 2006

(87) PCT Pub. No.: WO2005/043463

PCT Pub. Date: May 12, 2005

(65) Prior Publication Data

US 2007/0071173 A1 Mar. 29, 2007

(30) Foreign Application Priority Data

Oct. 30, 2003 (EP) .................................. 03104033

(51) Int. Cl.
*H05G 1/30* (2006.01)
(52) U.S. Cl. ........................................ 378/97; 378/98.7
(58) Field of Classification Search .................. 378/97, 378/98.7, 108, 207, 110
See application file for complete search history.

(56) References Cited

U.S. PATENT DOCUMENTS 5,388,138 A * 2/1995 Fujiwara ..................... 378/108
5,509,044 A * 4/1996 Horbaschek ................. 378/97

* cited by examiner

*Primary Examiner*—Hoon Song

(57) ABSTRACT

An X-ray examination apparatus arranged with control means to control a dose of an X-ray source in accordance with a grey-level distribution of an acquired image. The X-ray examination apparatus (1) comprises the X-ray unit (2) arranged to communicate data to the control and processing means (10). The X-ray unit (2) is arranged to generate a beam of X-rays (1*f*) propagating from an X-ray source (1*c*). The X-ray source (1*c*) together with the X-ray detector (1*b*)can be rotated about an acquisition volume V about a rotation axis (1*e*). The control and processing means (10) comprises an image processing means (3), which is arranged to compress the first image into the second image. Upon a compression of the first image with the grey-level compression function the resulting second image is forwarded to the control means (6), which is arranged to compute an average pixel value of the second image and to compare it with a pre-stored reference value. In case the computed average value substantially deviates from the pre-stored reference value a dose control signal C is sent to the X-ray source (1*c*) in order to modify its settings. The X-ray examination apparatus further comprises a viewing station, whereto the resulting image is forwarded. The viewing station comprises a processor (5) an input device (5*b*) and a console (5*a*) whereon the image is displayed by means of a suitable user interface (5*c*). After the image has been analyzed, it can be stored in a suitable database (7).

10 Claims, 3 Drawing Sheets

Figure 1:
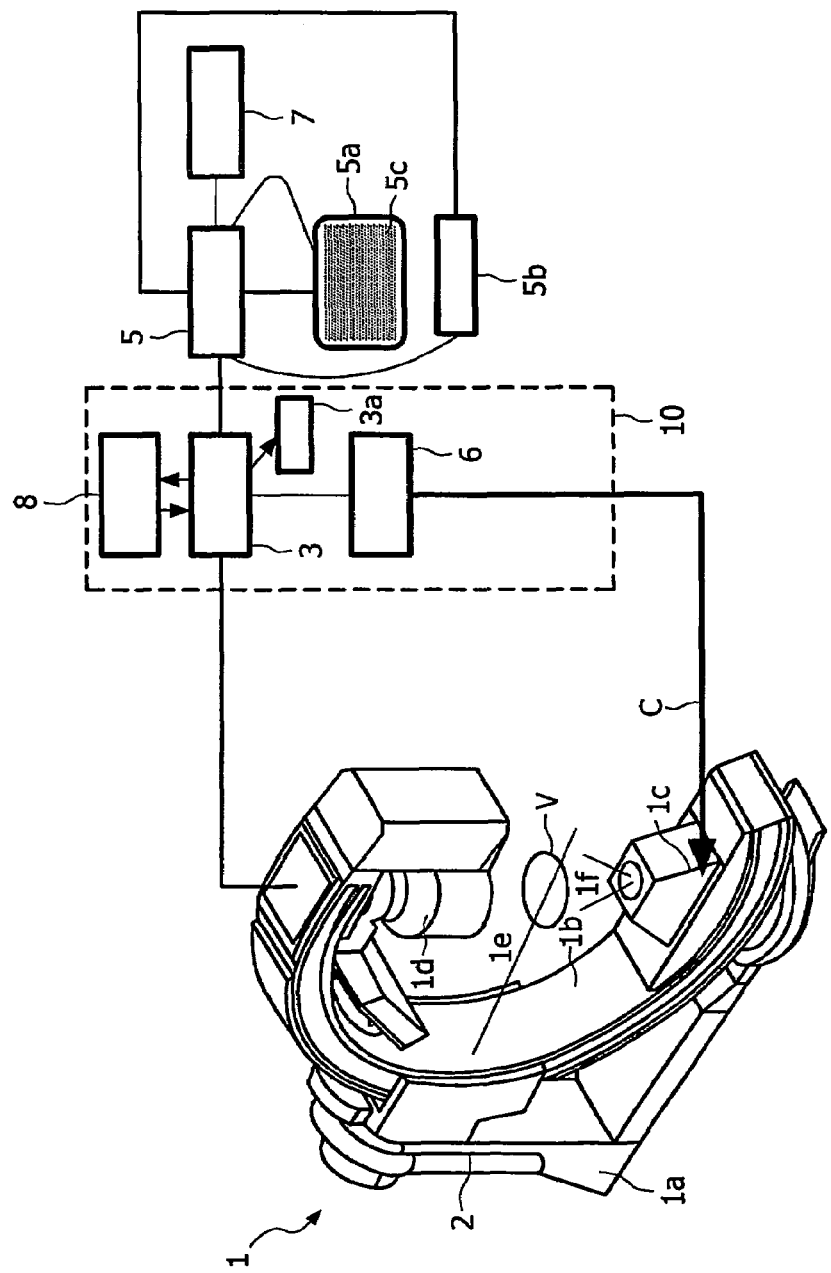

X-RAY EXAMINATION APPARATUS AND A METHOD OF CONTROLLING AN OUTPUT OF AN X-RAY SOURCE OF AN X-RAY EXAMINATION APPARATUS

The invention relates to an X-ray examination apparatus comprising:
a controllable X-ray source arranged to generate an X-ray beam;
an X-ray detector arranged to produce a first image upon an interception of the X-ray beam;
image processing means arranged to process at least a part of the first image with a grey-level compression function in order to compress the first image into a second image.

The invention further relates to a method of controlling an output of an X-ray source of an X-ray examination apparatus by means of a dose control signal, said method comprising the steps of:
acquiring a first X-ray image;
processing at least a part of the first X-ray image with a grey-level compression function in order to compress the first X-ray image into a second X-ray image.

An embodiment of an X-ray examination apparatus as is set forth in the opening paragraph is known from U.S. Pat. No. 5,388,138. The known X-ray examination apparatus comprises an X-ray source arranged to emit an X-ray beam, an X-ray detector arranged to convert X-rays radiated from the X-ray source into an X-ray image, an X-ray controller arranged to control a dose of the X-ray source upon a receipt of a dose control signal. In the known X-ray examination apparatus first the X-ray image is compressed by means of a suitable grey-level compression function which has a point of inflection beyond which a gradient thereof is reduced. A resulting image has a compressed range of grey-levels with respect to the original image. By this an influence of overexposed areas on the overall image is reduced. The dose control signal in the known X-ray apparatus is formed by luminous energy control means on basis of pixel values obtained in a determined region of interest of the compressed image in such a way that an average brightness of the region of interest is kept substantially at a pre-determined level.

It is a disadvantage of the known X-ray examination apparatus that in order to determine the dose control signal a delineation of the region of interest is required. A procedure of a delineation of the region of interest requires an attention of a skilled person and, therefore takes additional time. Next to this, for medical cases where the region of interest must be altered for purposes of detailed medical analysis, the known approach may be inappropriate, as due to a possible inclusion of a new neighboring region with a substantially different grey-level the resulting average image brightness may be substantially different with respect to an initial value, thus requiring a substantially different dose control signal. During a step of an image post-processing it is not possible to influence the dose control signal.

It is an object of the invention to provide an X-ray examination apparatus wherein a universal dose control signal for the X-ray source is determined without a delineation of the region of interest.

To this end the X-ray examination apparatus according to the invention comprises control means arranged to compute an average grey level value of pixels of the second image and to provide a dose control signal to the X-ray source in order to control the X-ray beam, the dose control signal being determined from a comparison between the computed average grey level value and a pre-stored reference value.

The technical measure of the invention is based on the insight that for cases when a measuring field exceeds the region of interest a problem arises that highlighted parts in the measuring field at the end lower the grey level of the region of interest. On the contrary, the dark parts in the measuring field make the region of interest appear brighter then required. These phenomena are intrinsic to the operation of the dose control system which determines a value of the dose control signal based on a comparison between a computed average pixel grey level value of the image and a reference value. In case the image comprises highlighted pixels, the average grey level value will increase, and a corresponding dose control signal will cause a corresponding reduction of an intensity of the X-ray source. As a result, the grey-level of intermediately lighted pixels corresponding to the region of interest will be reduced. A presence of low-lighted pixels in the image will have an opposite effect on a resulting grey level of intermediately lighted pixels. Therefore, the image processing means and the control means of the X-ray apparatus according to the invention are arranged to substantially reduce an influence of the high- or low-lighted pixels on the resulting computed average pixel grey level value by applying a suitable grey-level compression function. In order to reduce an influence of solely the high- or low-lighted pixels on the majority of the pixel grey-levels the grey-level compression function preferably comprises a suitable number of ranges, for example two, with a different grey level conversion factor. After the influence of these pixels on the resulting image grey-level is reduced, a universal dose control signal is determined by comparing the computed average grey level of the resulting second image to a pre-stored reference value. Preferably, the pre-stored reference value corresponds to a required grey-level of the image. In the X-ray apparatus according to the invention the dose control signal is determined in a full-automated way thus requiring no interference with a skilled medical person for a subjective delineation of the region of interest. Moreover, as the influence of the high- and/or low-lighted pixels on the overall image is substantially eliminated, the resulting dose control signal is valid for adequate viewing and examining of regions which belong to all possible regions of interest.

In an embodiment of the X-ray examination apparatus according to the invention the grey-level compression function comprises a monotonous function with a first linear range, a second linear range and a third linear range, the second linear range comprising the pre-stored reference value, a grey level compression factor of the second linear interval having substantially a value of one, grey level compression factors of the first linear range and the third linear range being substantially lower than one.

It is found to be particularly advantageous to provide the grey-level compression function as a tri-linear curve, wherein a mid-segment is selected in such a way that the intermediate grey levels of the first image are accepted unchanged. In this way picture elements with diagnostic information are uncompressed The corresponding grey level compression factors for the outer segments are substantially depressed thus maximally reducing an influence of the low- and high-lighted pixels on the average pixel value of the resulting image. As a result the second image comprises a weighted contribution of highlighted, low-lighted and intermediately lighted pixels. It must be noted that in order to insure a stable behavior of the control means the grey-level compression function must be monotone and continuous. The respective grey level compression factors must all be positive.

In a further embodiment of the X-ray examination apparatus according to the invention said apparatus further comprises computing means arranged to construct a grey-level histogram of the first image and to determine corresponding boundaries of the first linear range, the second linear range and the third linear range from said grey-level histogram.

It is found to be advantageous to individualize the partition of the grey-level compression function by constructing a grey-level histogram for each new set-up of an X-ray acquisition. In this way a shutter setting can be taken into account more precise and individually for each illumination session. Preferably, for images taken with a different angulation with respect to an object under examination, the grey-level histogram is constructed for each acquired image.

In a still further embodiment of the X-ray examination apparatus the computing means is further arranged to calculate a loop gain correction factor and to apply the loop gain correction factor to the dose control signal.

According to this technical measure a time behavior of the control loop is restored. Due to the fact that after image processing by means of the grey-level compression function the resulting pixel values of the image have lost their diagnostic value, the first images of next acquisitions should be starting-point for diagnostic interpretation. It is found to be advantageous to restore the loop gain value by first determining the loop gain correction factor and secondly by applying the loop gain correction factor to the dose control signal. Due to the chosen linearity of the grey-level compression function the loop gain correction factor can be easily determined. A corresponding mathematics will be given with reference to FIG. 1.

The method of controlling an output of an X-ray source of an X-ray examination apparatus according to the invention comprises the following steps:

computing an average grey level value of pixels of the second X-ray image;

comparing the computed average value and a pre-stored reference value;

providing a dose control signal to the X-ray source, said dose control signal being determined from said comparison.

According to the method according to the invention the influence of the low-and high-lighted pixels on the overall average pixel value of the image is substantially reduced thus providing a universal dose control signal enabling a correct viewing of all image areas.

These and other aspects of the invention will be further discussed with reference to figures.

FIG. 1 presents a schematic view of an embodiment of an X-ray examination apparatus according to the invention.

Figure 2A:
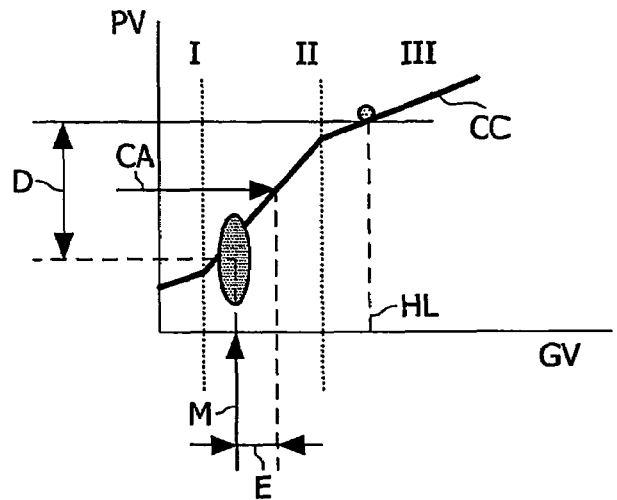

FIG. 2a presents a schematic view of a first embodiment of resulting computed average by means of application of a tri-linear grey-level compression function.

Figure 2B:
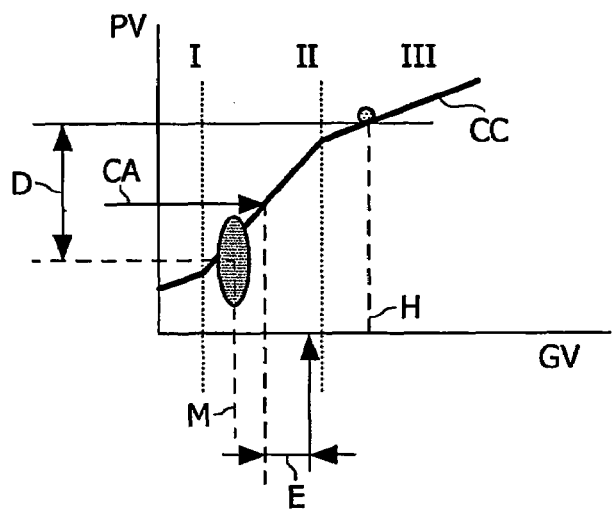

FIG. 2b presents a schematic view of a second embodiment of resulting computed average by means of application of a tri-linear grey-level compression function.

Figure 3:
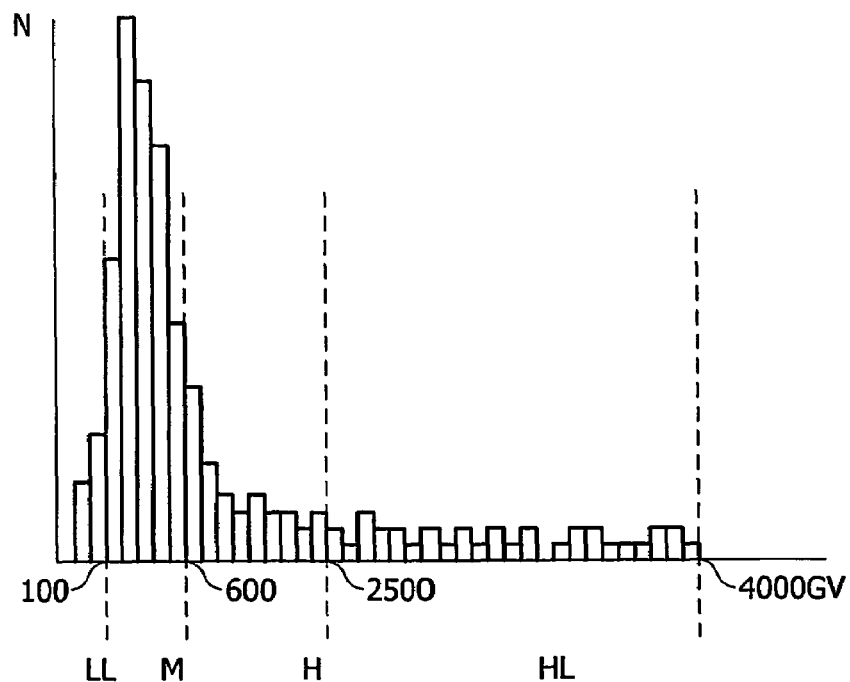

FIG. 3 presents a schematic view of an embodiment of a grey-level histogram of an acquired X-ray image.

Figure 4:
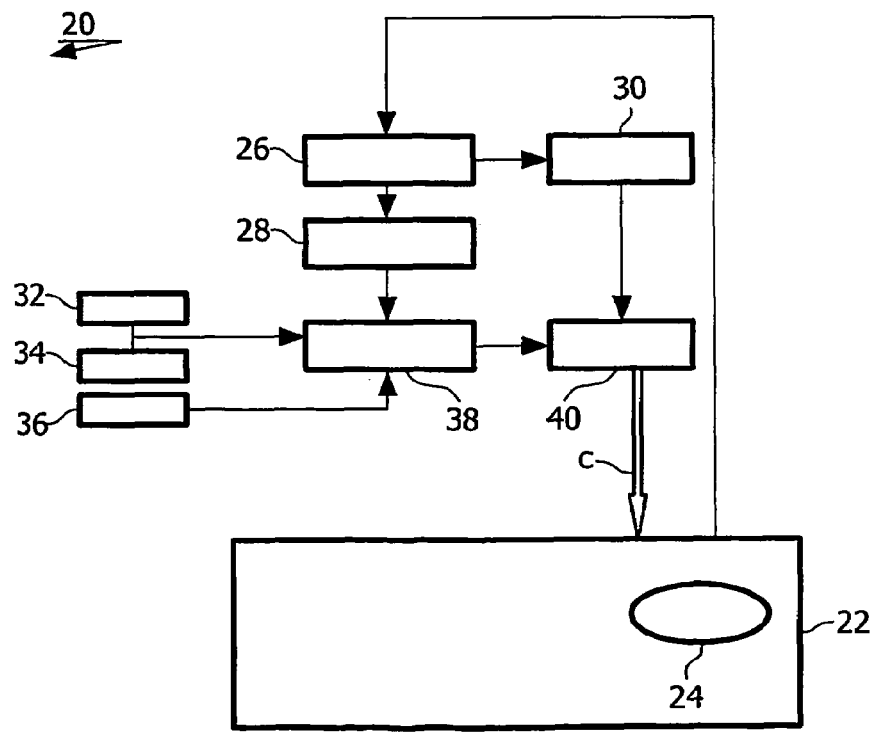

FIG. 4 presents a schematic view of an embodiment of an implementation of the method according to the invention.

FIG. 1 presents a schematic view of an embodiment of an X-ray examination apparatus according to the invention. The X-ray examination apparatus 1 comprises the X-ray unit 2 arranged to communicate data to the control and processing means 10. The X-ray unit 2 is arranged to generate a beam of X-rays If propagating from an X-ray source 1c. In order to obtain diagnostic data a patient (not shown) is placed in an acquisition volume V, located between the X-ray source 1 c and an X-ray detector 1d, where a transmission X-ray image is formed. Embodiments of a suitable X-ray detector comprise an image intensifier with a corresponding optics or a flat solid-state X-ray detector. This image is further referred to as the first image. In clinical circumstances it may be required to obtain the first image with a certain orientation. For this purpose the X-ray source 1c together with the X-ray detector 1d can be rotated about the acquisition volume V about a rotation axis 1e. This rotation is enabled by a movement of the gantry 1a, which is usually rotatably mounted on a suitable gantry support means (not shown). The first image is forwarded to the control and processing means 10. The control and processing means 10 comprise an image processing means 3, which is arranged to compress the first image into the second image. For this purpose the image processing means 3 can be arranged to address a pre-stored grey-level compression function 3a, or alternatively the image processing means 3 can be arranged to interact with a computing means 8. In the latter case the image processing means 3 makes available the first image to the computing means 8 where a corresponding grey-level histogram is calculated. The grey-level histogram is used to determine the boundaries of the first linear range, the second linear range and the third linear range for an individualized grey-level compression. It must be noted that for a majority of cases a usage of a pre-stored universal grey-level compression function will suffice. Upon a compression of the first image with the grey-level compression function the resulting second image is forwarded to the control means 6, which is arranged to compute an average pixel grey value of the second image and to compare it with a pre-stored reference value. In case the computed average value substantially deviates from the pre-stored reference value a dose control signal C is sent to the X-ray source 1c in order to modify its settings. Preferably, an intensity of the X-ray beam is modified. As a result an image with an optimal average pixel grey value is generated. Methods of suitable dose-control are known per se in the art; therefore a generation and an application of the dose control signal will not be explained in further detail.

Preferably, the X-ray examination apparatus further comprises a viewing station, whereto the resulting image with desired pixel grey level is forwarded. The gain of the dose control loop will decrease by the non-linearity of the compression function, resulting in slow control speed. For diagnostic purposes it may be required to restore the linear relation between the grey-level of the resulting image and the X-ray intensity. For this purpose the computing means 8 is arranged to compute a loop gain correction, which can be done according to a following example method:

The mean value of the measuring field in the first image is given by:

$$\text{MEAN} = \frac{I*L*f_L + I*M*f_M + I*H*f_H}{f_L + f_M + f_H}$$

where,

L, M, H are the average transmission factors of the respectively lower, medium and high part of the compression function $f_L$, $f_M$, $f_H$ are their respective measurement field fractions
I is intensity of the X-ray beam.

The mean value of the measurement field after the compression function is applied is given by:

$$\text{MEAN}' = \frac{\alpha_L * I * L * f_L + O_L * f_L + I * M * f_M + \alpha_H * I * H * f_H + O_H * f_H}{f_L + f_M + f_H}$$

where, $\alpha_L$, $\alpha_H$ are respective gradients of the linear lower and linear upper parts of the grey-level compression function;

$O_L$, $O_H$ are respective offsets of the linear lower and upper parts of the grey-level compression function.

The resulting loop gain correction function is given by:

$$\text{GainCorrection} = \frac{d(\text{Mean})/dI}{d(\text{Mean}')dI} = \frac{L * f_L + M * f_M + H * f_H}{\alpha_L * L * f_L + M * f_M + \alpha_H * H * f_H}$$

After an application of the loop gain correction to the dose control signal the time behavior of the control loop is restored.

The viewing station comprises a suitable processor 5 and a console 5a whereon the diagnostic image is displayed by means of a suitable user interface 5c. In case a user wishes to amend the diagnostic image an input device 5b is provided. After the diagnostic image has been analyzed, it can be stored in a suitable database 7.

FIG. 2a presents a schematic view of a first embodiment of resulting computed average by means of application of a tri-linear grey-level compression function. In this embodiment a following situation is described: a grey-level compression function CC comprises three linear intervals, schematically given by I, II, III and is set as a function of a pixel value PV of a grey value GV. The first linear range I has a substantially lower grey IS level compression factor than the second linear range II. The first linear range I is selected so that a weight of low-lighted pixels in the measuring field is substantially reduced. The second linear interval II is selected to comprise a value of the controlled average CA, which is referred to as the pre-stored reference value. In this example the measuring field comprises a main part M, which falls into the second linear range and a highlighted part HL, which falls into the third linear range. By applying the grey-level compression function a presence of the high-lighted part in the measuring field will be compensated, shifting the average value M to the left with respect to the controlled average CA. An absolute value of the shift is low due to the reduced grey level compression factor of the third linear interval. If the lower inclination point is chosen too high, the average value M will partly shift to the first linear interval. Because of the low grey level compression factor of the first linear interval the control balance will shift the error E much further to the low side to reach a compensation for the highlight. Therefore, the position of the inclination point must be chosen low enough. A suitable way to select the boundary of the respective intervals will be discussed with reference to FIG. 3.

FIG. 2b presents a schematic view of a second embodiment of resulting computed average by means of application of a tri-linear grey-level compression function. In this example the region of interest itself comprises a main part M falling into the second linear interval and a high part falling into the third linear interval. In this case the controlled average will shift the region of interest to a higher value. The mean error E depends on the level of the upper inclination point and on a grey level compression factor of the third linear interval III. By properly selecting both parameters the error E is kept low.

FIG. 3 presents a schematic view of an embodiment of a grey-level histogram of an acquired X-ray image. The grey-level histogram is scored as a number of hits N of pixels with a certain grey level GV versus the absolute value of the grey level GV. From the grey-level histogram is follows that for a typical first image a number of ranges can be identified. The lowest range corresponds to a low-lighted areas LL within the measuring field. This ranged is followed by a main part M of the region of interest. Typically, this range is centered around a grey level of 500. The main part M of the region of interest is followed by a high part H of the region of interest whereto high-lighted pixels from clinically relevant areas fall. The highest range corresponds to a high-lighted part of the measuring field HL, whereto belong high-lighted pixels from beyond the region of interest. From the analysis of the histogram it follows that it is preferable to select the reference grey-level value at about 500, the respective boundaries of the corresponding linear intervals of the grey-level compression functions being accordingly selected from the histogram. For example, the boundary between the first and the second linear intervals can be set at 100, the boundary between the second and the third linear interval can be set at 600. The boundary between the high part H and the high-lighted part HL is a subjective discrimination between region of interest or non-region of interest pixels. It must be noted that the way the histogram looks is dependent on the set-up of the X-ray unit and an orientation of the X-ray beam with respect to the patient. Therefore, it is advantageous to analyze the histogram for each individual set of images in order to achieve an individualized accurate dose control system.

FIG. 4 presents a schematic view of an embodiment of an implementation of the method according to the invention. The first image 24 is acquired by means of an X-ray examination unit 22. The first image is forwarded to the image processing means 26 where a grey-level compression function is applied to the image. Also, the image processing means 26 compute the loop gain correction factor 30. At a following step an average value of the compressed image is calculated by means of a suitable computing means 28. The average value is then forwarded to a control means 38 where the average value is compared to a pre-stored reference value. The reference value is addressed by the control means 38 from a look-up table 36. The control means 38 receives the values of gain 32 and limit 34 in order to calculate a necessary value of a control signal C to be applied to the X-ray unit 22 by means of a multiplying means 40. Preferably, the multiplying means receives an additional signal specifying a calculated loop gain correction factor 30.

The invention claimed is:

1. An X-ray examination apparatus (1) comprising:
   a controllable X-ray source (1c) arranged to generate an X-ray beam (1f);
   an X-ray detector (1d) arranged to produce a first image upon an interception of the X-ray beam (1f);
   image processing means (3) arranged to process at least a part of the first image with a grey-level compression function (3a) in order to compress the first image into a second image;
   control means (6) arranged to compute an average grey value of pixels of the second image and to provide a dose control signal (C) to the X-ray source (1c) in order to control the X-ray beam (1f), the dose control signal (C) being determined from a comparison between the computed average grey level value and a pre-stored reference value (CA).

2. An apparatus according to claim 1, wherein the grey level compression function (CC) comprises a plurality of compression ranges with substantially different grey level compression factors.

3. An X-ray apparatus according to claim 2, wherein the grey-level compression function (CC) comprises a monotonous function with a first linear range (I), a second linear range (II) and a third linear range (III), the second linear range comprising the pre-stored reference value (CA), the grey level compression factor of the second linear interval (II) having substantially a value of one, grey level compression factors of the first linear range (I) and the third linear range (III) being substantially lower than one.

4. An X-ray apparatus according to claim 3, wherein said apparatus further comprises computing means (8) arranged to construct a grey-level histogram of the first image and to determine corresponding boundaries of the first linear range, the second linear range and the third linear range from said grey-level histogram.

5. An X-ray apparatus according to claim 3, wherein said computing means (8) is further arranged to calculate a loop gain correction factor and to apply the loop gain correction factor to the dose control signal.

6. A method of controlling an output of an X-ray source of an X-ray examination apparatus by means of a dose control signal, said method comprising the steps of:
  acquiring a first X-ray image;
  processing at least a part of the first X-ray image with a grey-level compression function in order to compress the first X-ray image into a second X-ray image;
  computing an average grey level value of pixels of the second X-ray image;
  comparing the computed average value and a pre-stored reference value;
  providing a dose control signal to the X-ray source, said dose control signal being determined from said comparison.

7. A method according to claim 6, wherein for the grey level compression function a function with a plurality of compression ranges is selected, wherein consecutive compression ranges have a substantially different grey level compression factors.

8. A method according to claim 7, wherein for the grey-level compression function a monotonous function with a first linear range, a second linear range and a third linear range is selected, the second linear range comprising the pre-stored reference value, the grey level compression factor of the second linear range having substantially a value of one, grey level compression factors of the first linear range and the third linear range being substantially lower than one.

9. A method according to claim 8, wherein said method further comprises the steps of:
  constructing a grey-level histogram of the first image;
  determining corresponding boundaries of the first linear range, the second linear range and the third linear range from said grey-level histogram.

10. A method according to claim 8, wherein the method further comprises the steps of:
  calculating a loop gain correction factor;
  applying the loop gain correction factor to the dose control signal.

* * * * *